United States Patent [19]

Vanderpool et al.

[11] Patent Number: 4,608,235
[45] Date of Patent: Aug. 26, 1986

[54] RECOVERY OF COBALT

[75] Inventors: Clarence D. Vanderpool; Richard A. Scheithauer; Richard G. W. Gingerich, all of Towanda, Pa.

[73] Assignee: GTE Products Corporation, Stamford, Conn.

[21] Appl. No.: 714,329

[22] Filed: Mar. 21, 1985

[51] Int. Cl.$^4$ .............................................. C01G 51/00
[52] U.S. Cl. ....................................... 423/53; 423/59; 423/150; 423/596; 423/606; 423/641; 423/DIG. 12; 75/63; 75/65 R; 75/66; 75/93 R; 75/82; 75/101 R; 75/119; 75/121
[58] Field of Search ................... 423/53, 59, 641, 150, 423/606, 596, DIG. 12; 75/65 R, 63, 66, 93 R, 82, 101 R, 119, 121

[56] References Cited

U.S. PATENT DOCUMENTS

| | | | |
|---|---|---|---|
| 3,510,256 | 5/1970 | Schäfer | 423/596 |
| 3,859,412 | 1/1975 | Okabe et al. | 423/596 |
| 3,932,230 | 1/1976 | Summers | 75/93 R |
| 4,173,467 | 11/1979 | Rosof | 75/82 |
| 4,466,826 | 8/1984 | Vartiainen | 75/82 |

*Primary Examiner*—John Doll
*Assistant Examiner*—Robert L. Stoll
*Attorney, Agent, or Firm*—William H. McNeill

[57] ABSTRACT

A process is disclosed for recovering cobalt from an alloy containing other metals as chromium, tungsten, etc. The process involves first adding the alloy to fused sodium hydroxide at a temperature of from about 750° C. to about 1000° C. to form a reaction mixture, the amount of sodium hydroxide being sufficient to subsequently form sodium salts which are essentially those of chromium and tungsten and hydroxides which are essentially those of cobalt and nickel. The reaction mixture is then heated at a sufficient temperature for a sufficient time while introducing an oxidizing gas into the reaction mixture to form a melt which consists essentially of the sodium salts and the hydroxides, followed by cooling the melt. The cooled melt is then contacted with sufficient water to form a solution containing the major portion of the sodium salts and a solid containing the major portion of the hydroxides, followed by separating the solid from the solution. The solid is then washed with sufficient water to remove the remaining portion of the sodium salts and other water soluble impurities and then separated from the resulting wash water.

4 Claims, No Drawings

RECOVERY OF COBALT

FIELD OF THE INVENTION

This invention relates to a process for recovering cobalt from an alloy containing other metals as chromium, tungsten, nickel, etc. More particularly, it relates to a method for recovering cobalt from an alloy containing other metals as chromium, tungsten, nickel, etc. by reacting the alloy with fused sodium hydroxide at from about 750° C. to about 1000° C. to produce sodium salts of chromium and tungsten and hydroxides of cobalt and nickel.

BACKGROUND OF THE INVENTION

Stellites are a class of alloys used as hard facing materials and tools. They can contain up to about 65% by weight of cobalt with varying amounts of chromium, tungsten, and nickel with lesser amounts of iron, carbon, and silicon. In the fabrication of these tools or facing materials a large amount of material has to be removed by grinding or machining. The cobalt in this removed scrap material can be lost if it is not recovered from the material.

To recover cobalt from this type of material, the material, is dissolved in acids or oxidized with heat. However, because stellites are alloys of chromium, they are oxidation resistant and do not lend themselves to any simple recovery process.

Dissolution in acids as hydrochloric acid and sulfuric acid produces excessive amounts of hydrogen which is dangerous because of its explosive nature. Also, acid dissolution dissolves all the elements making a further separation necessary. It is possible to eliminate the evolution of hydrogen by first converting the stellites to oxides. However, again they are not easy to oxidize being oxidation resistant. Also, during any oxidation, the cobalt unites with the chromium producing cobalt chromite which is analogous to iron chromate, the natural ore of chromium. Cobalt chromite is acid insoluble making the recovery of cobalt with acid nearly impossible.

Reaction of stellites with sodium carbonate is hard to control and usually does not give a complete reaction with the chromium.

SUMMARY OF THE INVENTION

In accordance with one aspect of this invention, there is provided a process for recovering cobalt from an alloy containing other metals as chromium, tungsten, etc. The process involves first adding the alloy to fused sodium hydroxide at a temperature of from about 750° C. to about 1000° C., the amount of sodium hydroxide being sufficient to subsequently form sodium salts which are essentially those of chromium and tungsten and hydroxides which are essentially those of cobalt and nickel. The reaction mixture is then heated at a sufficient temperature for a sufficient time while introducing an oxidizing gas into the reaction mixture to form a melt which consists essentially of the sodium salts and the hydroxides, followed by cooling the melt. The cooled melt is then contacted with sufficient water to form a solution containing the major portion of the sodium salts and a solid containing the major portion of the hydroxides, followed by separating the solid from the solution. The solid is then washed with sufficient water to remove the remaining portion of the sodium salts and other water soluble impurities and then separated from the resulting wash water.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

By the process of this invention, cobalt is recovered from an alloy containing other metals as chromium, tungsten, nickel, etc., by reacting the alloy with fused sodium hydroxide at from about 750° C. to about 1000° C. with oxidation to produce sodium, essentially salts of chromium and tungsten, and hydroxides essentially of cobalt and nickel.

The starting material of this invention is typically an alloy of cobalt, chromium, and other metals as tungsten, nickel and possibly some iron, carbon, and silicon, with stellites being the most typical. Although stellite compositions can vary widely, a typical composition of stellite used as starting material in this invention is as follows--by weight: from about 20% to about 40% cobalt, from about 20% to about 40% chromium, up to about 10% tungsten, possibly from about 1.5% to about 2.5% carbon, and the balance of other components. The cobalt content can be up to about 65% by weight. The material is typically the scrap material from turning and machining operations.

Solid sodium hydroxide is first heated to from about 750° C. to about 1000° C., preferably about 800° C. preferably in an aluminum oxide container, although iron and steel containers or crucibles can be used. The alloy is then added preferably slowly to the fused sodium hydroxide at a temperature of from about 750° C. to about 1000° C. and preferably about 800° C. form a reaction mixture. The amount of sodium hydroxide that is used is sufficient to subsequently form sodium salts which are essentially those of chromium and tungsten, and hydroxides which are essentially those of cobalt and nickel, if present. Preferably from about 2 to about 3 parts by weight of sodium hydroxide are present per part of alloy starting material.

When the alloy is added to the fused sodium hydroxide at from about 750° C. to about 1000° C., a reaction takes place which produces a spongy type of material. A typical analysis of this spongy material is as follows—by weight: about 24% cobalt, about 6% nickel, about 16% chromium. Hydrogen is also produced as the spongy material is formed. The hydrogen burns off as indicated by a popping sound as it is produced and therefore does not accumulate to dangerous levels.

It is believed that the spongy material is produced when tungsten is removed from the alloy as sodium tungstate produced by the reaction of the tungsten with the sodium hydroxide and oxygen from the air. This leaves the cobalt, chromium, and nickel forming the spongy material. During the addition of the alloy to the sodium hydroxide, the hydrogen which evolves probably prevents the cobalt, nickel and chromium from being completely oxidized. However, when the spongy material is produced, the elements or metals which compose it are easily oxidized because of their increased surface area. It is this ability of the cobalt, nickel and chromium to be oxidized that is the basis for the recovery of cobalt as will be explained below.

After the alloy has been added and the reaction has subsided, the resulting reaction mixture, which consists essentially of the spongy material and a phase consisting essentially of sodium tungstate unreacted and sodium hydroxide, is then heated at a sufficient temperature and for a sufficient time while an oxidizing gas is being introduced into the reaction mixture to oxidize the metals contained therein to form a relatively uniformly appearing melt.

The oxidizing gas is preferably air, although oxygen can be used. The oxidizing gas is bubbled into the reaction mixture preferably through a stainless steel tube.

The reaction mixture is heated generally at from about 750° C. to about 1000° C. with from about 800° C. to about 850° C. being preferred.

The length of time of heating, and at the same time of introducing the oxidizing gas into the reaction mixture, depends upon how long it takes for the spongy material to disappear and the relatively uniformly appearing melt to form. This is usually about 2 hours and the heating time therefore is at least about 2 hours.

At the above described conditions of time, temperature, and oxidation, the metals are oxidized and the resulting melt consists essentially of sodium tungstate, sodium chromate and the respective hydroxides of cobalt and nickel. As stated previously, chromium is especially difficult to oxidize. But its oxidation is accomplished by the above defined process.

The resulting melt is allowed to cool. Generally the melt is poured from its container onto a metal or ceramic plate to cool. The cooled melt is then contacted with sufficient water at temperature to form a solution containing the major portion of the sodium salts and a solid containing the major portion of the hydroxides. The sodium salts as sodium tungstate, sodium chromate along with unreacted sodium hydroxide and any water soluble material dissolves. The resulting solid contains the major portion of the hydroxides of cobalt and nickel. The solid is then separated from the resulting solution by any standard technique such as filtration. The solid is then washed with sufficient water to remove the remaining portion of the sodium salts and other water soluble impurities and the wash water is then separated from the resulting washed solid by any standard technique such as by filtration. The solid contains about 98% by weight of the cobalt which was initially present in the alloy.

The washed solid which is now essentially free of chromium and tungsten can then be processed according to known methods for further purification and recovery of cobalt. For example, the washed solid can be contacted with concentrated hydrochloric acid to dissolve the solid and form a cobalt chloride solution. Any insolubles which can contain aluminum, silicon, tungsten, etc., can be removed from the cobalt chloride solution by any standard technique such as by filtration. The cobalt chloride solution can contain typically about 20 grams of Co per liter, about 1.4 grams of Fe per liter, about 0.55 grams of Cr per liter and about 4.5 grams of Al per liter. This cobalt chloride solution can be further processsed such as by precipitation of a complex of cobalt and hexamine which is eventually converted to cobalt metal powder.

To more fully illustrate this invention, the following non-limiting example is presented. All parts, portions, and percentages are on a weight basis unless otherwise stated. Example: About 300 parts of sodium hydroxide pellets are heated in an aluminum oxide container up to about 800° C. to fuse the sodium hydroxide. About 100 parts of stellite grinding material is then slowly added to the fused sodium hydroxide. As the stellite reacts with the sodium hydroxide, a popping sound is heard indicating evolution of hydrogen gas. After all the stellites are added and the reaction has subsided, there is a black spongy material in the resulting reaction mixture. Air is then bubbled through the reaction mixture in a stainless steel tube for about 2 hours while the reaction mixture is heated at a temperature of about 800° C. After this period, all of the spongy material appears to have disappeared and there is produced a relatively uniformly appearing melt. The melt is then allowed to cool. The cooled melt is then dissolved in about 2000 parts of water and the resulting mixture is heated at about 95° C. to about 100° C. for faster dissolution. The sodium chromate and sodium tungstate dissolve in the water while the cobalt and nickel hydroxides remain insoluble. The resulting solid containing about 98% of the starting cobalt as cobalt hydroxide and nickel hydroxide, and which is essentially free of the chromium and tungsten, is then slurried in about 480 parts of concentrated hydrochloric acid. Any remaining insoluble material is then removed from the resulting cobalt chloride solution by filtration. The resulting cobalt chloride solution contains about 51 grams of cobalt per liter, about 3.5 grams of Fe per liter, about 14 grams of nickel per liter, about 1.4 grams of chromium per liter and about 11 grams of aluminum per liter.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering cobalt from a stellite alloy containing cobalt, chromium, nickel and tungsten said process comprising:
   (a) adding said alloy to fused sodium hydroxide at a temperature of from about 750° C. to about 1000° C. to form a reaction mixture, the amount of said sodium hydroxide being sufficient to subsequently form sodium chromate and tungstate and cobalt hydroxide and nickel, hydroxide;
   (b) heating said reaction mixture at a temperature of from about 750° C. to about 1000° C. while introducing an oxidizing gas into said reaciton mixture to oxidize the metals contained therein and form a melt which consists essentially of said sodium salts and said hydroxides;
   (c) cooling said melt;
   (d) contacting the resulting cooled melt with water to form a solution containing the major portion of said sodium salts and a solid containing the major portion of said hydroxides;
   (e) separating said solid from said solution;
   (f) washing said solid with water to remove the remaining portion of said sodium salts; and
   (g) separating the resulting washed solid from the resulting wash water.

2. A process according to claim 1 wherein from about 2 to about 3 parts by weight of sodium hydroxide are present per part of said alloy.

3. A process according to claim 1 wherein said oxidizing gas is air.

4. A process according to claim 1 wherein said reaction mixture is heated and said oxidizing gas is introduced into said reaction mixture for at least about 2 hours.

* * * * *